US008209459B2

(12) United States Patent
Khatri et al.

(10) Patent No.: US 8,209,459 B2
(45) Date of Patent: Jun. 26, 2012

(54) SYSTEM AND METHOD FOR INCREASED SYSTEM AVAILABILITY IN VIRTUALIZED ENVIRONMENTS

(75) Inventors: Mukund P. Khatri, Austin, TX (US); Brent Alan Schroeder, Bee Cave, TX (US); Surender Brahmaroutu, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 983 days.

(21) Appl. No.: 12/059,162

(22) Filed: Mar. 31, 2008

(65) Prior Publication Data

US 2009/0248949 A1   Oct. 1, 2009

(51) Int. Cl.
*G06F 12/00* (2006.01)
(52) U.S. Cl. .................................... 711/6; 711/E12.016
(58) Field of Classification Search .................. None
See application file for complete search history.

(56) References Cited

U.S. PATENT DOCUMENTS

| | | | | |
|---|---|---|---|---|
| 6,654,906 | B1 | 11/2003 | Arndt | 714/11 |
| 6,658,591 | B1 * | 12/2003 | Arndt | 714/6.11 |
| 6,898,731 | B2 | 5/2005 | Hack et al. | 714/10 |
| 2005/0160151 | A1 * | 7/2005 | Rawson, III | 709/213 |
| 2007/0074067 | A1 * | 3/2007 | Rothman et al. | 714/6 |
| 2008/0256400 | A1 * | 10/2008 | Yang et al. | 714/57 |

OTHER PUBLICATIONS

Microsoft™ Windows™ Hardware Error Architecture, 12 pages, May 23, 2006.

* cited by examiner

*Primary Examiner* — Edward Dudek, Jr.
*Assistant Examiner* — John P Fishburn
(74) *Attorney, Agent, or Firm* — Baker Botts L.L.P.

(57) ABSTRACT

A method is provided for managing errors in a virtualized information handling system that includes an error detection system and a hypervisor allowing multiple virtual machines to run on the information handling system. The hypervisor may assign at least one memory region to each of multiple virtual machines. The error detection system may detect an error, determine a physical memory address associated with the error, and report that address to the hypervisor. Additionally, the hypervisor may determine whether the memory region assigned to each virtual machine includes the physical memory address associated with the error. The hypervisor may shut down each virtual machine for which a memory region assigned to that virtual machine includes the physical memory address associated with the error, and not shut down each virtual machine for which the memory regions assigned to that virtual machine do not include the physical memory address associated with the error.

14 Claims, 3 Drawing Sheets

SYSTEM AND METHOD FOR INCREASED SYSTEM AVAILABILITY IN VIRTUALIZED ENVIRONMENTS

TECHNICAL FIELD

The present disclosure relates in general to virtualized information handling systems, and more particularly to increasing system availability in virtualized information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Increasingly, information handling systems are deployed in architectures that allow multiple operating systems to run on a single information handling system. Labeled "virtualization," this type of information handling system architecture decouples software from hardware and presents a logical view of physical hardware to software. In a virtualized information handling system, a single server can act and behave as multiple, independent servers. Server virtualization is enabled primarily by a piece of software, often called the hypervisor, that sits between the server hardware and the multiple operating systems, also called guest operating systems (guest OS). The hypervisor software provides a container that presents a logical hardware interface to the guest operating systems. An individual guest operating system, along with any applications or other software running on it, thinks it is running on a physical server and is known as a virtual machine.

Often, these architectures are employed for numerous reasons, e.g., (1) increased hardware resource utilization; (2) cost-effective scalability across a common, standards-based infrastructure; (3) workload portability across multiple servers; (4) streamlining of application development by certifying to a common virtual interface rather than multiple implementations of physical hardware; and/or (5) encapsulation of complex configurations into a file that is easily replicated and provisioned.

However, an information handling system having a virtualized architecture may have a disadvantage when certain hardware errors occur, as such errors occurring in one virtual machine may cause all virtual machines running on the information handling system to crash or shut down.

SUMMARY

In accordance with the teachings of the present disclosure, the disadvantages and problems associated with error handling in a virtualized information handling system have been substantially reduced or eliminated.

In accordance with one embodiment of the present disclosure, a method is provided for managing errors in a virtualized information handling system that includes an error detection system and a hypervisor allowing multiple virtual machines to run on the virtualized information handling system. The hypervisor may assign at least one memory region to each of the multiple virtual machines. The error detection system may detect an error, determine a physical memory address associated with the error, and report the physical memory address to the hypervisor. Additionally, the hypervisor may determine, for each of the multiple virtual machines, whether the at least one memory region assigned to that virtual machine includes the physical memory address associated with the error. The hypervisor may shut down each virtual machine for which the at least one memory region assigned to that virtual machine includes the physical memory address associated with the error, but not shut down each virtual machine for which the at least one memory region assigned to that virtual machine does not include the physical memory address associated with the error.

In accordance with another embodiment of the present disclosure, an information handling system may include an error detection system and a hypervisor allowing multiple virtual machines to run on the information handling system. The hypervisor may be configured to assign at least one memory region to each of the multiple virtual machines. The error detection system may be configured to detect an error, determine a physical memory address associated with the error, and report the physical memory address to the hypervisor. The hypervisor may also be configured to determine for each of the multiple virtual machines whether the at least one memory region assigned to that virtual machine includes the physical memory address associated with the error. Additionally, the hypervisor may be configured to shut down each virtual machine for which the at least one memory region assigned to that virtual machine includes the physical memory address associated with the error, and not shut down each virtual machine for which the at least one memory region assigned to that virtual machine does not include the physical memory address associated with the error.

A further embodiment of the present disclosure includes a hypervisor allowing multiple virtual machines to run on an information handling system. The hypervisor may be configured to assign at least one memory region to each of the multiple virtual machines. The hypervisor may also be configured to receive from an error detection system a physical memory address associated with an error. Additionally, the hypervisor may be configured to determine, for each of the multiple virtual machines, whether the at least one memory region assigned to that virtual machine includes the physical memory address associated with the error. The hypervisor may be further configured to shut down each virtual machine for which the at least one memory region assigned to that virtual machine includes the physical memory address associated with the error, and not shut down each virtual machine for which the at least one memory region assigned to that virtual machine does not include the physical memory address associated with the error.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
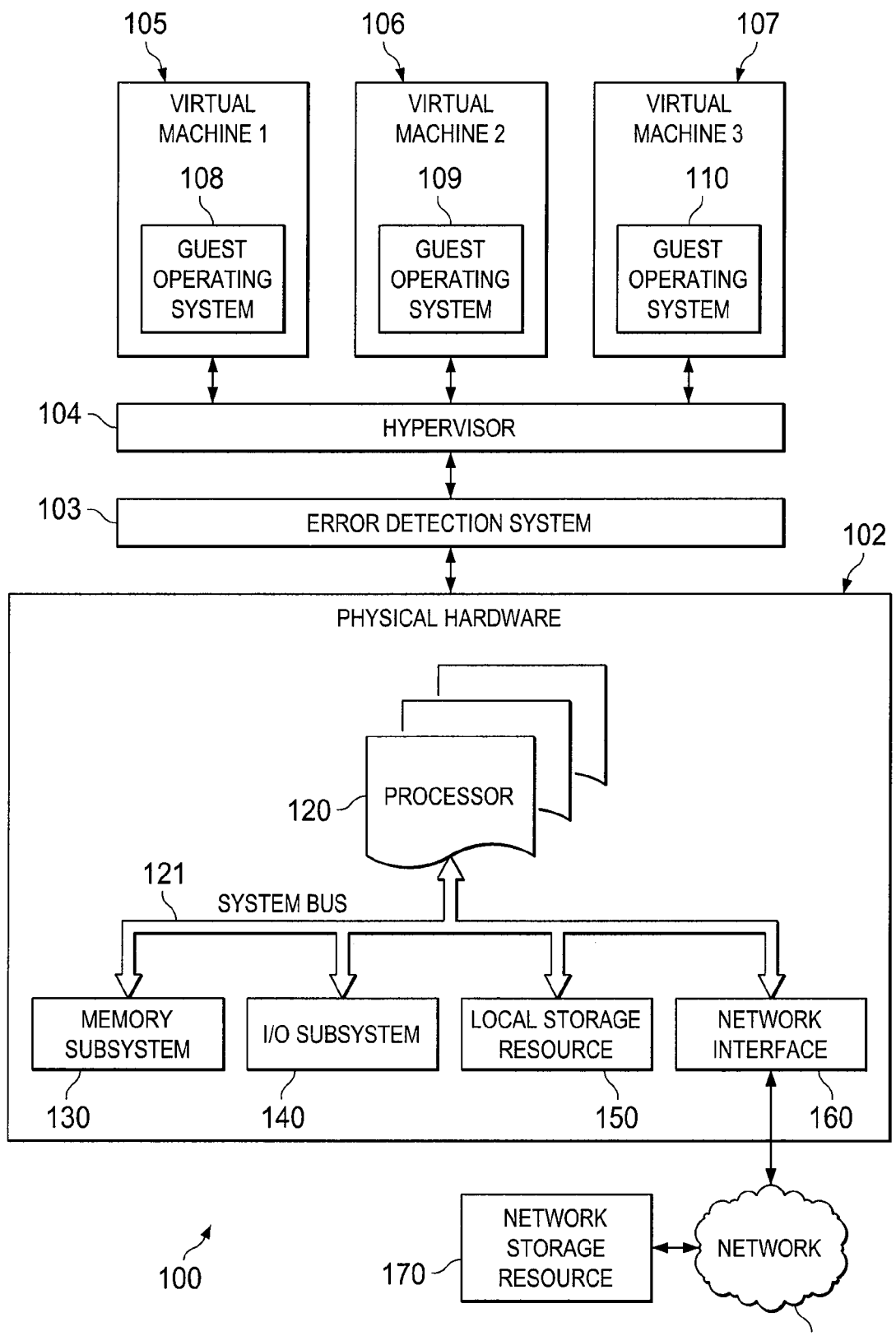
FIG. 1 illustrates a block diagram of an example system for increasing system availability in a virtualized information handling system, in accordance with the present disclosure.
Figure 2:
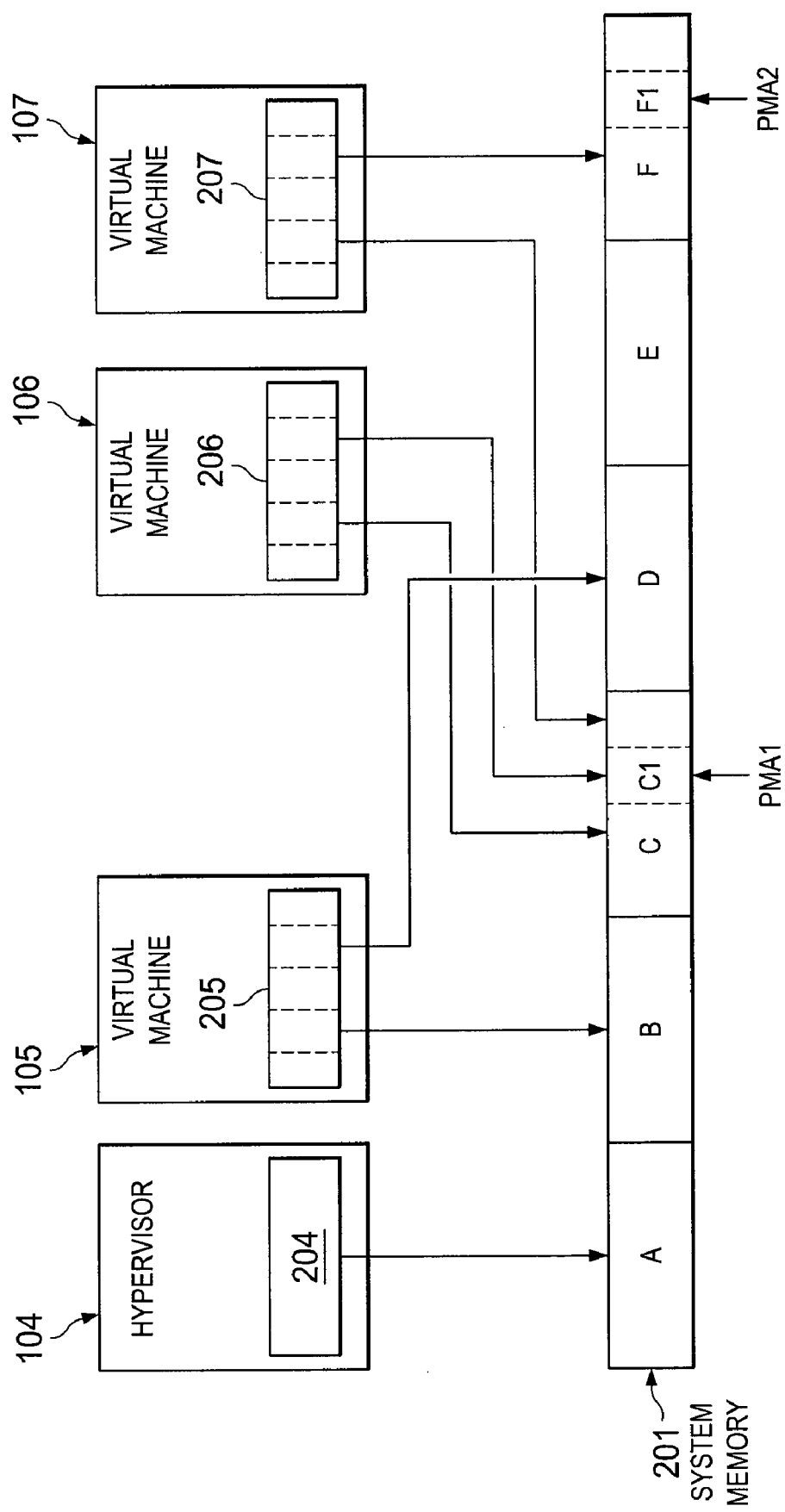
FIG. 2 illustrates a block diagram of the hypervisor assigning regions of system memory to the virtual machines in a virtualized information handling system, in accordance with the present disclosure.
Figure 3:
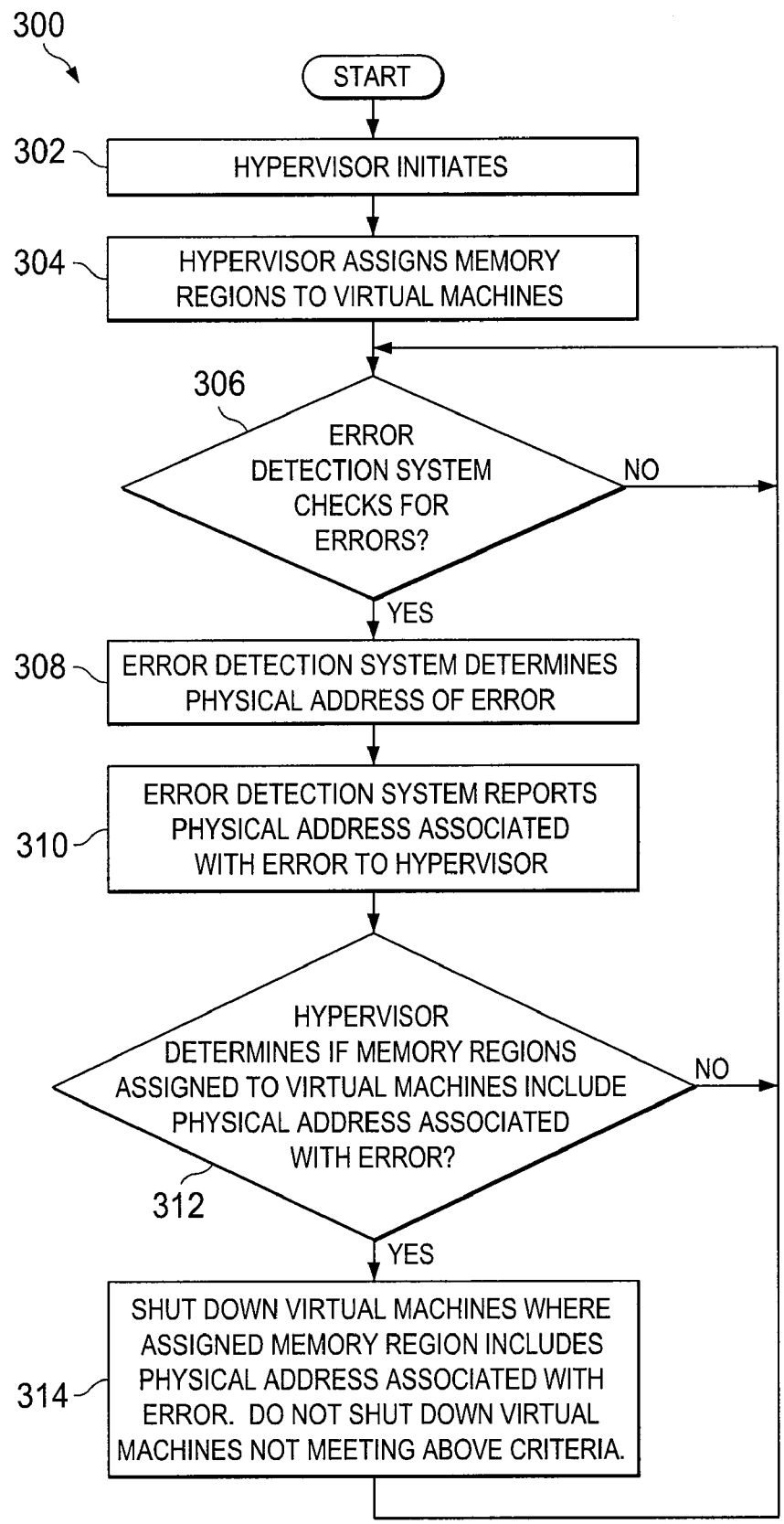
FIG. 3 illustrates a flow chart of an example method for managing errors in a virtualized information handling system including an error detection system and a hypervisor allowing multiple virtual machines to run on the virtualized information handling system, in accordance with the present disclosure.

Preferred embodiments and their advantages are best understood by reference to FIGS. 1, 2, and 3 wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Additionally, the information handling system may include firmware for controlling and/or communicating with, for example, hard drives, network circuitry, memory devices, I/O devices, and other peripheral devices. For example, the hypervisor and/or the error detection system, both described more fully below, may comprise firmware. As used in this disclosure, firmware includes any software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

FIG. 1 illustrates a block diagram of an example system 100 for increasing system availability in a virtualized information handling system, in accordance with the present disclosure. As depicted in FIG. 1, system 100 may comprise physical hardware 102, an error detection system 103, a hypervisor 104, and one or more virtual machines 105-107.

Components of physical hardware 102 may include, but are not limited to, one or more processors 120 and a system bus 121 that communicatively couples various system components to processors 120 including, for example, a memory subsystem 130, an I/O subsystem 140, local storage resource 150, and a network interface 160. The system bus 121 may be any suitable type of bus structure, e.g., a memory bus, a peripheral bus, or a local bus using any of a variety of bus architectures. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

Network interface 160 may be any suitable system, apparatus, or device operable to serve as an interface between information handling system 100 and a network 155. Network interface 160 may enable information handling system 100 to communicate over network 155 using any suitable transmission protocol and/or standard, including without limitation all transmission protocols and/or standards enumerated below with respect to the discussion of network 155.

In some embodiments, network interface 160 may be communicatively coupled via network 155 to network storage resource 170. Network 155 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 155 may transmit data using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 155 and its various components may be implemented using hardware, software, or any combination thereof.

Processors 120 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processors 120 may interpret and/or execute program instructions and/or process data stored locally (e.g., in memory subsystem 130 and/or another component of physical hardware 102). In the same or alternative embodiments, processors 120 may interpret and/or execute program instructions and/or process data stored remotely (e.g., in network storage resource 170).

Memory subsystem 130 may comprise any system, device, or apparatus operable to retain program instructions or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to its associated information handling system 100 is turned off.

Local storage resource 150 may comprise computer-readable media (e.g., hard disk drive, floppy disk drive, CD-ROM, and/or other type of rotating storage media, flash memory, EEPROM, and/or other type of solid state storage media) and may be generally operable to store data.

Likewise, network storage resource 170 may comprise computer-readable media (e.g., hard disk drive, floppy disk drive, CD-ROM, and/or other type of rotating storage media, flash memory, EEPROM, and/or other type of solid state storage media) and may be generally operable to store data.

I/O subsystem 140 may comprise any system, device, or apparatus generally operable to receive and/or transmit data to/from/within information handling system 100. I/O subsystem 140 may comprise, for example, any number of communication interfaces, graphics interfaces, video interfaces, user input interfaces, and/or peripheral interfaces.

Error detection system 103 may comprise any system, device, or apparatus generally operable to detect errors that occur within physical hardware 102 of information handling system 100, and report those errors to hypervisor 104. In reporting such errors, error detection system 103 may include in the error report various information including, for example, the hardware resource from which the error originated, the type of error, the physical memory address at which the error occurred, and/or any other information that may be associated with the error. Although depicted as external to physical hardware 102, error detection system 103 and its various components may be implemented as hardware within physical hardware 102, firmware running on physical hardware 102 (including, e.g., as a component of hypervisor 104), software running on physical hardware 102 (including, e.g., as a component of hypervisor 104), or any combination thereof.

Hypervisor 104 may comprise software and/or firmware generally operable to allow multiple operating systems to run on a single information handling system at the same time. This operability is generally allowed via virtualization, a technique for hiding the physical characteristics of information handling system resources from the way in which other systems, applications, or end users interact with those resources. Hypervisor 104 may be one of a variety of proprietary and/or commercially available virtualization platforms, including without limitation, IBM's Z/VM, XEN, ORACLE VM, VMWARE's ESX SERVER, L4 MICROKERNEL, TRANGO, MICROSOFT's HYPER-V, SUN's LOGICAL DOMAINS, HITACHI's VIRTAGE, KVM, VMWARE SERVER, VMWARE WORKSTATION, VMWARE FUSION, QEMU, MICROSOFT's VIRTUAL PC and VIRTUAL SERVER, INNOTEK's VIRTUALBOX, and SWSOFT's PARALLELS WORKSTATION and PARALLELS DESKTOP.

In one embodiment, hypervisor 104 may comprise a specially designed operating system (OS) with native virtualization capabilities. In another embodiment, hypervisor 104 may comprise a standard OS with an incorporated virtualization component for performing virtualization.

In another embodiment, hypervisor 104 may comprise a standard OS running alongside a separate virtualization application. In this embodiment, the virtualization application of hypervisor 104 may be an application running above the OS and interacting with physical hardware 102 only through the OS. Alternatively, the virtualization application of hypervisor 104 may, on some levels, interact indirectly with physical hardware 102 via the OS, and, on other levels, interact directly with physical hardware 102 (e.g., similar to the way the OS interacts directly with physical hardware 102, or as firmware running on physical hardware 102). As a further alternative, the virtualization application of hypervisor 104 may, on all levels, interact directly with physical hardware 102 (e.g., similar to the way the OS interacts directly with physical hardware 102, or as firmware running on physical hardware 102) without utilizing the OS, although still interacting with the OS to coordinate use of physical hardware 102.

To allow multiple operating systems to run on information handling system 100 at the same time, hypervisor 104 virtualizes the hardware resources of physical hardware 102 and presents virtualized computer hardware representations to each of virtual machines 105-107. In other words, hypervisor 104 may assign to each of virtual machines 105-107, for example, one or more processors 120, one or more regions of memory in memory subsystem 130, one or more components of I/O subsystem 140, etc. The virtualized hardware representation presented to each of virtual machines 105-107 may comprise a mutually exclusive, or non-overlapping, set of hardware resources per virtual machine (e.g., no hardware resources are shared between virtual machines) or may comprise an overlapping set of hardware resources per virtual machine (e.g., one or more hardware resources may be shared by two or more virtual machines).

In one embodiment, hypervisor 104 may assign hardware resources of physical hardware 102 statically (i.e., certain hardware resources are assigned to certain virtual machines, and this assignment does not vary over time). Additionally or alternatively, hypervisor 104 may assign hardware resources of physical hardware 102 dynamically (i.e., the assignment of hardware resources to virtual machines varies over time, for example, in accordance with the specific needs of the applications running on the individual virtual machines). Additionally or alternatively, hypervisor 104 may keep track of the hardware-resource-to-virtual-machine mapping, such that hypervisor 104 is able to determine the virtual machines to which any given hardware resource of physical hardware 102 has been assigned.

Each of virtual machines 105-107 may include a guest operating system (guest OS) 108-110, along with any applications or other software running on guest OS 108-110. Each guest OS 108-110 may be any OS compatible with and/or supported by hypervisor 104 (even if guest OS is generally incompatible with physical hardware 102). In addition, each guest OS 108-110 may be a separate instance of the same operating system or an instance of three different operating systems. For example, in one embodiment, each guest OS 108-110 may comprise a LINUX OS. As another example, guest OS 108 may comprise a LINUX OS, guest OS 109 may comprise a MICROSOFT WINDOWS OS, and guest OS 110 may comprise a VXWORKS OS. Although information handling system 100 is depicted as having three virtual machines 105-107, any number of virtual machines may be running on information handling system 100 at any given time.

In operation, hypervisor 104 of information handling system 100 may virtualize the hardware resources of physical hardware 102 and present virtualized computer hardware representations to each of virtual machines 105-107. Each guest OS 108-110 of virtual machines 105-107 may then begin to operate and run applications and/or other software. While operating, each guest OS 108-110 may utilize one or more hardware resources of physical hardware 102 assigned to the respective virtual machine by hypervisor 104.

If an uncorrectable/unrecoverable hardware error occurs in physical hardware 102, error detection system 103 may detect the error and report the error to hypervisor 104. In reporting such errors, error detection system 103 may include in the error report various information including, for example, the hardware resource from which the error originated, the type of error, the physical memory address at which the error occurred, or any other information that may be associated with the error.

In one embodiment, error detection system 103 may report the error to hypervisor 104 directly, for example, by invoking a callback routine in hypervisor 104, by triggering an interrupt handler in hypervisor 104, or by triggering an exception handler in hypervisor 104. In the same or alternative embodiments, error detection system 103 may report the error to hypervisor 104 indirectly by writing to volatile or non-volatile storage an error log that may be subsequently (e.g., through polling) processed by hypervisor 104. In the same or alternative embodiments, error detection system 103 may report the error to hypervisor 104 using the Microsoft Windows Hardware Error Architecture (WHEA).

Because hypervisor 104 keeps track of the hardware-resource-to-virtual-machine mapping, hypervisor 104 may determine whether the hardware resource associated with the error is assigned to any of virtual machines 105-107. If hypervisor 104 determines that the hardware resource associated with the error is, in fact, assigned to any of virtual machines 105-107, hypervisor 104 may shut down any such virtual machines. At the same time, hypervisor 104 may not shut down any of virtual machines 105-107 to which the hardware resource associated with the error is not assigned. Thus, virtual machines in this latter category may continue to run, and may not be affected by the hardware error.

To "shut down" a resource or application (e.g., a virtual machine 105-107 or a guest OS 108-110), as such term is used herein, may refer to any method or function associated with stopping, or reducing the level of, the operation of a resource or application, including but not limited to, triggering a non-maskable interrupt, forcing a machine check exception, reporting bug-check (BSOD on the Windows platform), halting/freezing for debug (e.g., crash-dump), executing a built-in recovery mechanism, rebooting according to a reboot policy (user-defined or otherwise), and/or turning off or closing the virtual machine.

FIG. 2 illustrates a block diagram of the hypervisor 104 assigning regions of system memory to the virtual machines 105-107 in virtualized information handling system 100, in accordance with the present disclosure. As shown in FIG. 2, each of virtual machines 105-107 and hypervisor 104 may include virtual memory regions 205-207 and 204, respectively. Information handling system 100 may include system memory 201, which may be a component of physical hardware 102 (depicted in FIG. 1).

System memory 201 may comprise any system, device, or apparatus operable to retain program instructions or data for a period of time (e.g., computer-readable media). System memory 201 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to its associated information handling system 100 is turned off. In one embodiment, system memory 201 may be a component of memory subsystem 130 of information handling system 100.

System memory 201 may be organized into physical memory regions A-F, where each memory region A-F represents a range of physical memory addresses at which data may be stored. For example, data C1 may be stored in physical memory region C at physical memory address PMA1. Likewise, data F1 may be stored in physical memory region F at physical memory address PMA2.

In operation, hypervisor 104 may virtualize the hardware resources of information handling system 100 and present virtualized computer hardware representations to each of virtual machines 105-107. Thus, with respect to FIG. 2, virtual memory regions 205-207 comprise one or more physical regions of system memory 201 that hypervisor 104 has assigned (i.e., "virtualized") to each of virtual machines 105-107. The virtualized hardware representation presented to each of virtual machines 105-107 may comprise a mutually exclusive, or non-overlapping, set of physical memory regions per virtual machine (i.e., no physical memory regions are shared between virtual machines). In the same or alternative embodiments, the virtualized hardware representation presented to each of virtual machines 105-107 may comprise an overlapping set of physical memory regions per virtual machine (i.e., one or more physical memory regions may be shared by two or more virtual machines).

In one embodiment, hypervisor 104 may assign physical memory regions A-F of system memory 201 statically (i.e., certain physical memory regions are assigned to certain virtual machines, and this assignment does not vary over time). Additionally or alternatively, hypervisor 104 may assign physical memory regions A-F of system memory 201 dynamically (i.e., the assignment of physical memory regions to virtual machines varies over time, for example, in accordance with the specific needs of the applications running on the individual virtual machines). Additionally or alternatively, hypervisor 104 may keep track of the physical-memory-region-to-virtual-machine mapping, such that hypervisor 104 is able to determine the virtual machines to which any given physical memory region A-F of system memory 201 has been assigned.

Thus, in the embodiment depicted in FIG. 2, virtual memory region 204 of hypervisor 104 may correspond to physical memory region A (arrows indicate virtual-to-physical memory region mapping). In addition, hypervisor 104 may assign to virtual machine 105 virtual memory region 205 comprising at least physical memory regions B and D. Hypervisor 104 may also assign to virtual machine 106 virtual memory region 206 comprising at least physical memory region C. Further, hypervisor 104 may assign to virtual machine 107 virtual memory region 207 comprising at least physical memory regions C and F.

If an uncorrectable/unrecoverable memory error occurs, for example, when data F1 at physical memory address PMA2 is accessed, error detection system 103 (FIG. 1) would detect the error, determine that the error occurred at physical memory address PMA2, and report physical memory address PMA2 to hypervisor 104. In reporting such errors, error detection system 103 may include in the error report various information including, for example, the hardware resource from which the error originated (e.g., system memory 210), the type of error, the physical memory address at which the error occurred (e.g., PMA2), and/or any other information that may be associated with the error. In one embodiment, error detection system 103 may report the error to hypervisor 104 directly, for example, by invoking a callback routine in hypervisor 104, by triggering an interrupt handler in hypervisor 104, or by triggering an exception handler in hypervisor 104. In the same or alternative embodiments, error detection system 103 may report the error to hypervisor 104 indirectly by writing to volatile or non-volatile storage an error log that may be subsequently (e.g., through polling) processed by hypervisor 104. In the same or alternative embodiments, error detection system 103 may report the error to hypervisor 104 using the Microsoft Windows Hardware Error Architecture (WHEA).

Hypervisor 104 may then determine that physical memory address PMA2 is within the physical memory region F assigned to virtual machine 107, and as a result, shut down virtual machine 107. However, because physical memory region F was not assigned to virtual machines 105 or 106, hypervisor 104 may not shut down virtual machines 105 and 106, allowing them to continue running.

Alternatively, if an uncorrectable/unrecoverable memory error occurs, for example, when data C1 at physical memory address PMA1 is accessed, error detection system 103 (FIG. 1) may detect the error, determine that the error occurred at physical memory address PMA1, and report physical memory address PMA1 to hypervisor 104. In reporting such errors, error detection system 103 may include in the error report various information including, for example, the hardware resource from which the error originated (e.g., system memory 210), the type of error, the physical memory address at which the error occurred (e.g., PMA1), and/or any other information that may be associated with the error. In one embodiment, error detection system 103 may report the error to hypervisor 104 directly, for example, by invoking a callback routine in hypervisor 104, by triggering an interrupt handler in hypervisor 104, or by triggering an exception handler in hypervisor 104. In the same or alternative embodiments, error detection system 103 may report the error to hypervisor 104 indirectly by writing to volatile or non-volatile storage an error log that may be subsequently (e.g., through polling) processed by hypervisor 104. In the same or alternative embodiments, error detection system 103 may report the error to hypervisor 104 using the MICROSOFT WINDOWS HARDWARE ERROR ARCHITECTURE (WHEA).

Hypervisor 104 may then determine that physical memory address PMA1 is within the physical memory region C assigned to both virtual machines 106 and 107, and as a result, shut down virtual machines 106 and 107. However, because physical memory region C was not assigned to virtual machine 105, hypervisor 104 may not shut down virtual machine 105, allowing it to continue running.

FIG. 3 illustrates a flow chart of an example method 300 for managing errors in virtualized information handling system 102 including an error detection system 103 and a hypervisor 104 allowing multiple virtual machines 105-107 to run on the virtualized information handling system 102, in accordance with the present disclosure.

According to one embodiment, method 300 preferably begins at step 302. As noted above, teachings of the present disclosure may be implemented in a variety of configurations of system 100. As such, the preferred initialization point for method 300 and the order of the steps 302-314 comprising method 300 may depend on the implementation chosen.

At step 302, information handling system 100 may initialize. For example, information handling system 100 may be powered on, and hypervisor 104 may initiate. At step 304, the hypervisor, now running on information handling system 100, may virtualize the physical hardware 102 and present virtualized computer hardware representations to each of virtual machines 105-107. For example, hypervisor 104 may assign physical memory regions B and D to virtual machine 105, physical memory region C to virtual machine 106, and physical memory regions C and F to virtual machine 107.

At step 306, virtual machines 105-107, now operating, are accessing components of physical hardware 102 that have been presented to each as part of the respective virtualized computer hardware representation by hypervisor 104. During this step, error detection system 103 may continually check for errors. At step 308, the error detection system may determine the physical address of the error. For example, if the error occurred during a memory access of data F1 in system memory 201, error detection system 103 may determine that the physical memory address associated with the error is PMA2. At step 310, error detection system 103 may report the physical address associated with the error to hypervisor 104. Consistent with the previous example, error detection system 103 may report PMA2 to hypervisor 103 when a memory access of data F1 in system memory 201 resulted in an error.

At step 312, hypervisor 104 may determine whether any of memory regions 205-207 assigned to virtual machines 105-107 include the physical memory address associated with the error. In continuing the foregoing example where an error occurs at PMA2, hypervisor 104 may determine that memory region 207 assigned to virtual machine 107 includes PMA2 because hypervisor 104 assigned region F to virtual machine 107 at step 304. At step 314, hypervisor 104 may shut down any of virtual machines 105-107 for which a memory region assigned to an individual virtual machine includes the physical memory address associated with the error. Also at step 314, hypervisor 104 may not shut down any of virtual machines 105-107 for which a memory region assigned to an individual virtual machine does not include the physical memory address associated with the error. Thus, in the foregoing example where an error occurs at PMA2, hypervisor 104 may shut down virtual machine 107 because memory region 207 includes the physical memory address associated with error (PMA2), but not shut down virtual machines 105 and 106 because the memory regions 205 and 206 assigned to each of virtual machines 205 and 206 do not include the physical memory address associated with the error (PMA2).

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order. For example, in the embodiment of method 300 shown above, the hypervisor 104 determining whether memory regions assigned to virtual machines include the physical address associated with the error, and subsequently shutting down any virtual machines that meet that criteria and not shutting down any virtual machines that do not meet that criteria is depicted in two steps (312 and 314) where the hypervisor acts on all virtual machines at the same time. In an alternative embodiment of method 300, hypervisor 104 may perform these steps one virtual machine at a time while iterating over those virtual machines that are running.

Method 300 may be implemented using information handling system 100 or any other system operable to implement method 300. In certain embodiments, method 300 may be implemented partially or fully in software embodied in computer-readable media.

Using the methods and systems disclosed herein, problems associated with conventional approaches to error handling in a virtualized information handling system may be improved, reduced, or eliminated.

Although the present disclosure has been described in detail, it should be understood that various changes, substitutions, and alterations can be made hereto without departing from the spirit and the scope of the disclosure as defined by the appended claims.

What is claimed is:

1. A method for managing errors in a virtualized information handling system including an error detection system and a hypervisor allowing multiple virtual machines to run on the virtualized information handling system, comprising:
   the hypervisor dynamically assigning to each of the multiple virtual machines at least one memory region based at least on an application requirement from the multiple virtual machines;
   the error detection system detecting an error, determining a physical memory address associated with the error, and reporting the physical memory address to the hypervisor;
   the hypervisor determining, for each of the multiple virtual machines, whether the at least one memory region assigned to that virtual machine includes the physical memory address associated with the error;
   the hypervisor shutting down each virtual machine for which the at least one memory region assigned to that virtual machine includes the physical memory address associated with the error;
   the hypervisor not shutting down each virtual machine for which the at least one memory region assigned to that virtual machine does not include the physical memory address associated with the error; and
   the error detection system reporting the physical memory address associated with the error to the hypervisor using Microsoft Windows Hardware Error Architecture.

2. A method according to claim 1, further comprising the hypervisor assigning non-overlapping memory regions to each of the multiple virtual machines such that at most one virtual machine is assigned a memory region that includes the physical memory address associated with the error.

3. A method according to claim 1, further comprising the error detection system reporting the physical memory address associated with the error directly to the hypervisor.

4. A method according to claim 1, wherein the error detection system comprises platform firmware.

5. A method according to claim 1, wherein the error comprises one of: a memory subsystem error, a system bus error, and an I/O subsystem error.

6. An information handling system, comprising:
   a hypervisor embodied in non-transitory computer readable media, the hypervisor allowing multiple virtual machines to run on the information handling system, the hypervisor configured to dynamically assign to each of the multiple virtual machines at least one memory region based at least on an application requirement from the multiple virtual machines;
   an error detection system configured to detect an error, determine a physical memory address associated with the error, and report the physical memory address associated with the error to the hypervisor using the Microsoft Windows Hardware Error Architecture; and
   the hypervisor further configured to:
      determine for each of the multiple virtual machines whether the at least one memory region assigned to that virtual machine includes the physical memory address associated with the error;
      shut down each virtual machine for which the at least one memory region assigned to that virtual machine includes the physical memory address associated with the error; and
      not shut down each virtual machine for which the at least one memory region assigned to that virtual machine does not include the physical memory address associated with the error.

7. An information handling system according to claim 6, the hypervisor further configured to assign non-overlapping memory regions to each of the multiple virtual machines such that at most one virtual machine is assigned a memory region that includes the physical memory address associated with the error.

8. An information handling system according to claim 6, the error detection system further configured to report the physical memory address associated with the error directly to the hypervisor.

9. An information handling system according to claim 6, wherein the error detection system comprises platform firmware.

10. An information handling system according to claim 6, wherein the error comprises one of: a memory subsystem error, a system bus error, and an I/O subsystem error.

11. A hypervisor embodied on a non-transitory computer readable medium and allowing multiple virtual machines to run on an information handling system, the hypervisor configured to:
   dynamically assign to each of the multiple virtual machines at least one memory region based at least on an application requirement from the multiple virtual machines;
   use the Windows Hardware Error Architecture to receive from an error detection system a physical memory address associated with the error;
   determine, for each of the multiple virtual machines, whether the at least one memory region assigned to that virtual machine includes the physical memory address associated with the error;
   shut down each virtual machine for which the at least one memory region assigned to that virtual machine includes the physical memory address associated with the error; and
   not shut down each virtual machine for which the at least one memory region assigned to that virtual machine does not include the physical memory address associated with the error.

12. A hypervisor according to claim 11, the hypervisor further configured to assign non-overlapping memory regions to each of the multiple virtual machines such that at most one virtual machine is assigned a memory region that includes the physical memory address associated with the error.

13. A hypervisor according to claim 11, the hypervisor further configured to receive directly from the error detection system the physical memory address associated with the error.

14. A hypervisor according to claim 11, wherein the error comprises one of: a memory subsystem error, a system bus error, and an I/O subsystem error.

* * * * *